(12) United States Patent
True et al.

(10) Patent No.: US 9,553,398 B2
(45) Date of Patent: Jan. 24, 2017

(54) HERMETIC FEED THROUGH ASSEMBLY

(71) Applicant: General Electric Company

(72) Inventors: John Austin True, Holliston, MA (US); Jesse Aaron Caira, Waltham, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/731,477

(22) Filed: Jun. 5, 2015

(65) Prior Publication Data
US 2016/0359261 A1 Dec. 8, 2016

(51) Int. Cl.
*H01R 13/52* (2006.01)

(52) U.S. Cl.
CPC ................. *H01R 13/5219* (2013.01)

(58) Field of Classification Search
CPC .................................................. H01R 13/5219
USPC ....... 439/283, 606, 281, 736, 589, 693, 604, 439/935, 587
See application file for complete search history.

(56) References Cited

U.S. PATENT DOCUMENTS

| | | | | |
|---|---|---|---|---|
| 5,493,073 | A | * 2/1996 | Honkomp | H01B 17/305 174/152 GM |
| 5,584,716 | A | * 12/1996 | Bergman | H01R 13/5202 174/152 GM |
| 6,506,083 | B1 | 1/2003 | Bickford et al. | |
| 6,509,525 | B2 | * 1/2003 | Honkomp | H01B 17/303 174/152 GM |
| 6,851,962 | B2 | * 2/2005 | McCormack, III | H01R 13/748 439/276 |
| 7,094,967 | B2 | 8/2006 | Evans et al. | |
| 7,442,081 | B2 | 10/2008 | Burke et al. | |
| 7,500,793 | B2 | 3/2009 | Patel et al. | |
| 7,901,247 | B2 | 3/2011 | Ring | |

* cited by examiner

*Primary Examiner* — Edwin A. Leon
(74) *Attorney, Agent, or Firm* — Cooper Legal Group, LLC

(57) ABSTRACT

An electrical feed through assembly includes a mechanical connector extending between a first end and a second end. The mechanical connector defines at least one opening through the mechanical connector between the first end and the second end. The electrical feed through assembly includes a first electrical connector attached to the first end of the mechanical connector. The first electrical connector includes a conductor portion that extends through the at least one opening in the mechanical connector. The first electrical connector includes a grounded portion within which the conductor portion is received. An inner radial surface of the grounded portion is sealed with the conductor portion. An outer radial surface of the grounded portion is attached to the mechanical connector.

20 Claims, 4 Drawing Sheets

HERMETIC FEED THROUGH ASSEMBLY

BACKGROUND

Feed through assemblies can be used to pass an electrical conductor from one area to another, such as into a pipeline or vessel, for example. In past examples, feed through assemblies had a relatively limited ability to reduce leakage. This leakage may include liquids, gas, etc. As a result of this leakage, degradation of the signal that is passed through the electrical conductor may occur. Additionally, replacement of the electrical conductor and/or the feed through assembly may be necessitated as a result of this leakage.

The costs associated with replacing parts of the feed through assembly and/or due to signal loss is relatively high. It would therefore be beneficial to provide a sealed feed through assembly that limits leakage up to a specified pressure rating while providing for electrical isolation of the electrical conductor such that signal integrity through the electrical conductor may be maintained.

SUMMARY

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

The disclosed subject matter is generally directed towards feed through assembly and, in particular, is directed towards a sealed feed through assembly that provides electrical isolation and resistance to leakage.

In an example, an electrical feed through assembly includes a mechanical connector extending between a first end and a second end. The mechanical connector defines at least one opening through the mechanical connector between the first end and the second end. The electrical feed through assembly includes a first electrical connector configured to be attached to the first end of the mechanical connector. The first electrical connector includes a conductor portion that is configured to extend through the at least one opening in the mechanical connector. The first electrical connector includes a grounded portion within which the conductor portion is received. An inner radial surface of the grounded portion is configured to be sealed with the conductor portion. An outer radial surface of the grounded portion is configured to be attached to the mechanical connector.

In another example, an electrical feed through assembly includes a mechanical connector extending between a first end and a second end. The mechanical connector defines at least one opening through the mechanical connector between the first end and the second end. The electrical feed through assembly includes a first electrical connector configured to be attached to the first end of the mechanical connector. The first electrical connector includes a conductor portion that is configured to extend through the at least one opening in the mechanical connector. The first electrical connector includes a grounded portion within which the conductor portion is received. An outer radial surface of the grounded portion is configured to be hermetically sealed to the mechanical connector.

In another example, an electrical feed through assembly includes a mechanical connector extending between a first end and a second end. The mechanical connector defines at least one opening through the mechanical connector between the first end and the second end. A first electrical connector is configured to be attached to the first end of the mechanical connector. The first electrical connector includes a conductor portion that is configured to extend through the at least one opening in the mechanical connector. The first electrical connector includes a grounded portion within which the conductor portion is received. An inner radial surface of the grounded portion is configured to be sealed with the conductor portion. An outer radial surface of the grounded portion is configured to be attached to the mechanical connector. A second electrical connector is configured to be attached to the second end of the mechanical connector. The second electrical connector includes a second conductor portion that is configured to extend through the at least one opening in the mechanical connector. The second conductor portion is electrically connected to the conductor portion of the first electrical connector. A second grounded portion is received within the second conductor portion. An inner radial surface of the second grounded portion is configured to be sealed with the second conductor portion. An outer radial surface of the second grounded portion is configured to be attached to the mechanical connector.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

BRIEF DESCRIPTION OF THE DRAWING

The foregoing and other aspects of the disclosed subject matter will become apparent to those skilled in the art to which the disclosed subject matter relates upon reading the following description with reference to the accompanying drawings, in which.

DETAILED DESCRIPTION

Figure 1:
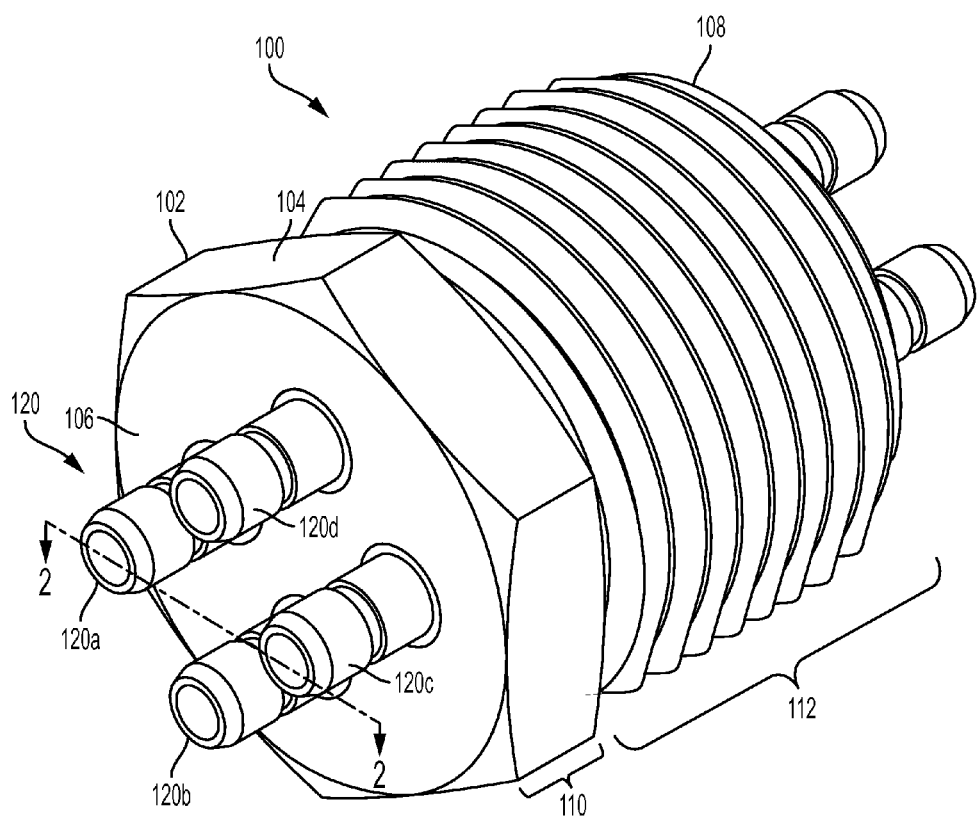
FIG. 1 is a perspective illustration of an example electrical feed through assembly.

Example embodiments that incorporate one or more aspects of the disclosure are described and illustrated in the drawings. These illustrated examples are not intended to be a limitation on the disclosure. For example, one or more aspects can be utilized in other embodiments and even other types of devices. Moreover, certain terminology is used herein for convenience only and is not to be taken as a limitation. Still further, in the drawings, the same reference numerals are employed for designating the same elements.

An electrical connector can be provided for transmitting electrical signals between two locations. The electrical connector can be relatively easily attached to and/or detached from a structure, such as a mechanical connector. The electrical connector can form a seal with the mechanical connector, such as a hermetic seal, for example. In an example, the electrical connector can limit a leakage of materials (e.g., gas, liquids, etc.) into the electrical connector while also protecting signal integrity of the electrical signals. Other embodiments are within the scope of the disclosed subject matter.

Turning to FIG. 1, an example of an electrical feed through assembly 100 is illustrated. The electrical feed through assembly 100 can be used in any number of different environments, including oil and gas environments, for example. In an example, the electrical feed through assembly 100 can be used in inclement environments that may or may not be associated with oil and gas environments. These inclement environments may include, for example, the presence of one or more of relatively high or low temperatures, caustic and/or corrosive materials (e.g., liquids, gases, etc.), gas(es) that may have the ability to negatively affect an electrical assembly, moistures and/or liquids, etc. In some examples, the electrical feed through assembly 100 can be used to protect (e.g., shield, defend, etc.) one or more electrical conductors and limit the aforementioned environmental conditions from adversely affecting the performance of the one or more electrical conductors.

It will be appreciated that the electrical feed through assembly 100 that is illustrated in FIG. 1 includes merely one of a number of different constructions/configurations. As such, the electrical feed through assembly 100 is not limited to the illustrated construction.

The electrical feed through assembly 100 may include a mechanical connector 102. The mechanical connector 102 typically has a mechanical connector body 104. The mechanical connector body 104 may include any number of different materials, including metal materials such as stainless steel or the like. In this example, the mechanical connector body 104 can have at least some degree of rigidity so as to limit the likelihood of deformation, ingress/egress of unwanted materials, etc. The mechanical connector 102 can extend between a first end 106 and a second end 108. In this example, the mechanical connector 102 can extend substantially linearly along an axis though, in other possible examples, the mechanical connector 102 can have one or more bends, turns, angles, or the like.

The mechanical connector 102 can include one or more connector portions. For example, the mechanical connector 102 can have a hex portion 110 and a threaded portion 112. The hex portion 110 can have a hexagonal cross-sectional shape (though other shapes are envisioned) to allow for easier gripping/grasping between a wrench and the hex portion 110 of the mechanical connector 102. In this example, the hex portion 110 may be located adjacent the first end 106 of the mechanical connector 102.

The threaded portion 112 of the mechanical connector 102 can have an exterior threading so as to be inserted (e.g., with threading attachment) into a pipe or other structure. In a possible example, the threaded portion 112 can have a cross-sectional size (e.g., diameter) of about ½ inch (e.g., between about 12 millimeters to about 13 millimeters), though other sizes are envisioned. In this example, the threaded portion 112 may be located adjacent the second end 108 of the mechanical connector 102.

The electrical feed through assembly 100 can include one or more electrical connectors 120. The electrical connectors 120 can extend partially or completely through the mechanical connector body 104 of the mechanical connector 102. In this example, the electrical connectors 120 can extend through the mechanical connector body 104 of the mechanical connector 102 between the first end 106 and the second end 108. In the illustrated example, the electrical feed through assembly 100 can include four electrical connectors 120a, 120b, 120c, and 120d. In other examples, however, the electrical feed through assembly 100 is not so limited, and, instead, can include six electrical connectors, eight electrical connectors, etc.

Figure 2:
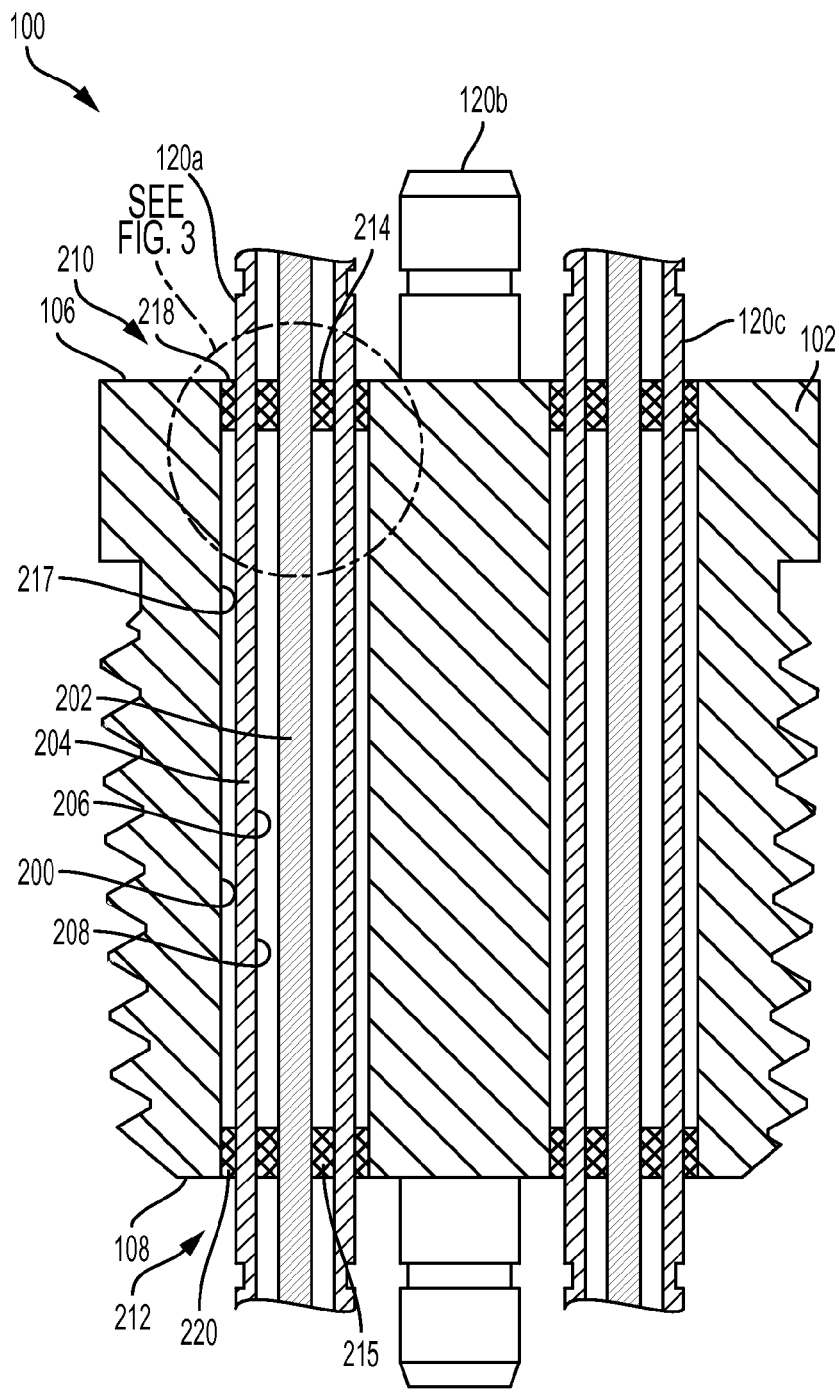
FIG. 2 is a sectional illustration along lines 2-2 of FIG. 1 of the example electrical feed through assembly.

Turning to FIG. 2, a cross-sectional view of the mechanical connector 102 is illustrated as viewed along lines 2-2 of FIG. 1. In this example, a sectional view of two of the electrical connectors 120 (e.g., a first electrical connector 120a and a third electrical connector 120c) is illustrated. It will be appreciated that the other, unillustrated electrical connectors 120, including a second electrical connector 120b and a fourth electrical connector 120d, may be substantially similar to the first electrical connector 120a and the third electrical connector 120c.

Focusing upon the first electrical connector 120a, the first electrical connector 120a can extend through an opening 200 in the mechanical connector 102. The mechanical connector 102 can define at least one opening (e.g., the opening 200) through the mechanical connector body 104 of the mechanical connector 102 between the first end 106 and the second end 108. In this example, the mechanical connector 102 can define four openings through the mechanical connector 102 through which the first electrical connector 120a, the second electrical connector 120b, the third electrical connector 120c, and the fourth electrical connector 120d can extend through.

In this example, the first electrical connector 120a can be attached to the first end 106 and/or the second end 108 of the mechanical connector 102. The first electrical connector 120a can include a conductor portion 202. The conductor portion 202 can extend through the at least one opening 200 in the mechanical connector 102. In this example, the conductor portion 202 extends substantially continuously through the opening 200 in the mechanical connector 102 between the first end 106 and the second end 108. In an example, the conductor portion 202 can include an electrically conductive material, such that the conductor portion 202 is capable of electrically transmitting signals, current, etc. The conductor portion 202 can include, for example, metal materials, or the like.

The first electrical connector 120a can include a grounded portion 204 within which the conductor portion 202 is received. In this example, the grounded portion 204 extends substantially continuously through the opening 200 in the mechanical connector 102 between the first end 106 and the second end 108. In an example, the grounded portion 204 can include an electrically conductive material, such that the grounded portion 204 can act as an electrical shield or an electrical ground. The grounded portion 204 can include, for example, metal materials, or the like.

The grounded portion 204 is substantially hollow so as to define a channel 206 extending through a center of the grounded portion 204 between opposing ends. In an example, the grounded portion 204 can receive the conductor portion 202 within the channel 206 such that the conductor portion 202 and the grounded portion 204 can extend substantially coaxially with respect to each other. In a possible example, the conductor portion 202, the grounded portion 204, and the opening 200 in the mechanical connector 102 can extend substantially coaxially with respect to each other.

The grounded portion 204 can include an inner radial surface 208 that defines an interior (e.g., the channel 206) of the grounded portion 204. In an example, the inner radial surface 208 of the grounded portion 204 can be sealed with the conductor portion 202. In an example, the seal between the grounded portion 204 and the conductor portion 202 may include a non-conductive seal. In the illustrated example, the inner radial surface 208 of the grounded portion 204 can be sealed with the conductor portion 202 at a first location 210, which is adjacent the first end 106 of the mechanical connector 102, and a second location 212, which is adjacent the second end 108 of the mechanical connector 102. Between the first location 210 and the second location 212, such as further within the opening 200 of the mechanical connector 102, the inner radial surface 208 of the grounded portion 204 may not be sealed with the conductor portion 202. That is, a gap, space, void region, etc. may be located between the inner radial surface 208 and the conductor portion 202 at a region between the first location 210 and the second location 212.

In the illustrated example, a first seal 214 between the inner radial surface 208 of the grounded portion 204 and the conductor portion 202 can be formed at the first location 210. A second seal 215 between the inner radial surface 208 of the grounded portion 204 and the conductor portion 202 can be formed at the second location 212. The first seal 214 and the second seal 215 can extend circumferentially around the conductor portion 202 and within the grounded portion 204. It will be appreciated that the electrical feed through assembly 100 is not limited to including the plurality of seals (e.g., the first seal 214, the second seal 215, etc.) and/or the dimensions that are illustrated and described herein. Rather, in other examples, the first seal 214 can extend a longer distance than as illustrated, such as by extending partially or completely through the mechanical connector 102. Similarly, in some examples, the second seal 215 can extend a longer distance than as illustrated, such as by extending partially or completely through the mechanical connector 102.

In this example, the first seal 214 and/or the second seal 215 include a hermetic seal, such as a glass to metal seal. The first seal 214 and/or the second seal 215, which may include the hermetic seal, between the inner radial surface 208 of the grounded portion 204 and the conductor portion 202 can limit the ingress/egress of unwanted materials into and/or out of the opening 200. For example, the first seal 214 and/or the second seal 215 can limit unwanted materials such as moisture, liquids, particulates, gases, vapors, etc. from passing between the grounded portion 204 and the conductor portion 202. As such, these unwanted materials are substantially limited from passing through the mechanical connector 102 (e.g., between the first end 106 and the second end 108) between the grounded portion 204 and the conductor portion 202.

Figure 3:
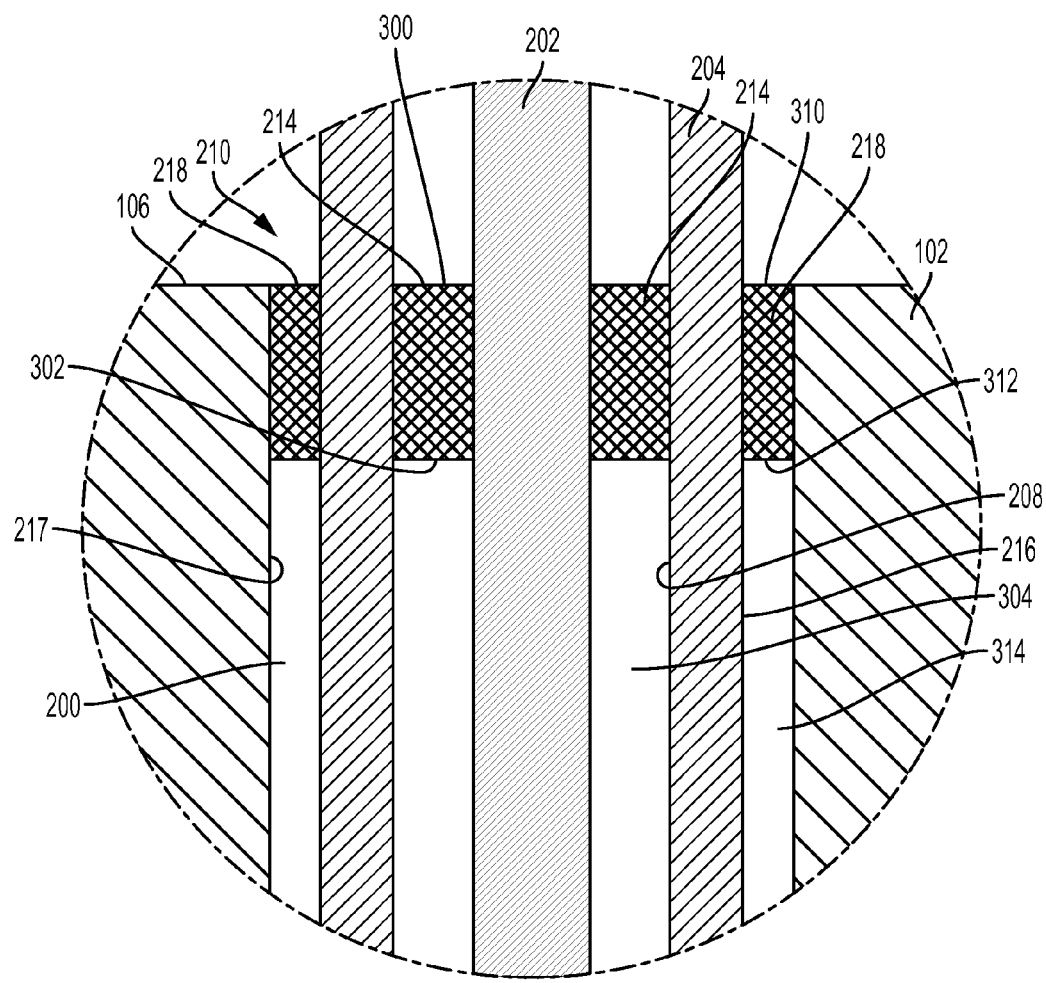
FIG. 3 is a further enlarged, sectional illustration of a first end of the example electrical feed through assembly.

Turning to FIG. 3, an enlarged view of the first location 210 at the first end 106 of the mechanical connector 102 is illustrated. Some the structures may be better seen in FIG. 3. The grounded portion 204 can include an outer radial surface 216 that defines an exterior of the grounded portion 204. In an example, the outer radial surface 216 of the grounded portion 204 can be attached to an inner wall 217 of the mechanical connector 102 at the first location 210, which is adjacent the first end 106 of the mechanical connector 102, and the second location 212 (see FIG. 2), which is adjacent the second end 108 of the mechanical connector 102. Between the first location 210 and the second location 212, such as further within the opening 200 of the mechanical connector 102, the outer radial surface 216 of the grounded portion 204 may not be attached to the inner wall 217 of the mechanical connector 102. That is, a gap, space, void region, etc. may be located between the outer radial surface 216 and the inner wall 217 of the mechanical connector 102 at a region between the first location 210 and the second location 212.

In this example, the attachment between the outer radial surface 216 of the grounded portion 204 and the inner wall 217 of the mechanical connector 102 can include a seal. In an example, the seal between the grounded portion 204 and the mechanical connector 102 can include a non-conductive seal. In the illustrated example, a third seal 218 between the outer radial surface 216 (see FIG. 3) of the grounded portion 204 and the inner wall 217 of the mechanical connector 102 can be formed at the first location 210. A fourth seal 220 between the outer radial surface 216 of the grounded portion 204 and the inner wall 217 of the mechanical connector 102 can be formed at the second location 212 (see FIG. 2). In an example, the third seal 218 and the fourth seal 220 can extend circumferentially around the grounded portion 204 and within the inner wall 217 of the mechanical connector 102.

In this example, the third seal 218 and/or the fourth seal 220 include a hermetic seal, such as a glass to metal seal. The third seal 218 and/or the fourth seal 220, which may include the hermetic seal, between the outer radial surface 216 of the grounded portion 204 and the inner wall 217 of the mechanical connector 102 can limit the ingress/egress of unwanted materials into and/or out of the opening 200. For example, the third seal 218 and/or the fourth seal 220 can limit unwanted materials such as moisture, liquids, particulates, gases, vapors, etc. from passing between the grounded portion 204 and the inner wall 217 of the mechanical connector 102. As such, these unwanted materials are substantially limited from passing through the mechanical connector 102 (e.g., between the first end 106 and the second end 108) between the grounded portion 204 and the mechanical connector 102.

In this example, at the first location 210, the grounded portion 204 can be attached to and/or sealed with the inner wall 217 of the mechanical connector 102 at an outer radial side and with the conductor portion 202 at an inner radial side. At the second location 212, the grounded portion 204 can be attached to and/or sealed with the inner wall 217 of the mechanical connector 102 at the outer radial side and with the conductor portion 202 at the inner radial side. As used herein, by being "attached," one or more structures can be attached without forming a seal. That is, in an example, two structures can be attached to each other in such a manner that a seal is not formed between the two structures. In another example, two structures can be sealed with respect to each other, such that the two structures may be both attached (e.g., fixed, coupled, etc.) and sealed (e.g., limiting ingress and/or egress of materials, gas, liquids, etc. through) with respect to each other.

In some examples, the first seal 214 and the second seal 215 can function to seal the grounded portion 204 to the conductor portion 202 at both the first end 106 and the second end 108 of the mechanical connector 102. The third seal 218 and the fourth seal 220 function to seal the grounded portion 204 to the inner wall 217 of the mechanical connector 102 at both the first end 106 and the second end 108 of the mechanical connector 102. As such, the unwanted materials are substantially limited from passing through the mechanical connector 102 due to the presence of the seals.

In addition to limiting the ingress/egress of unwanted materials, the first seal 214, the second seal 215, the third seal 218, and the fourth seal 220 can function to electrically isolate one or more components. For example, the conductor portion 202 can be electrically isolated from the grounded portion 204 by the first seal 214 and the second seal 215. As such, electrical current flow between the grounded portion 204 and the conductor portion 202 is substantially limited/reduced. Additionally, the grounded portion 204 can be electrically isolated from the mechanical connector body 104 of the mechanical connector 102 by the third seal 218 and the fourth seal 220. As such, electrical current flow between the grounded portion 204 and the mechanical connector 102 can be substantially limited/reduced. Accordingly, the seals can function to electrically isolate the conductor portion 202 from the grounded portion 204 and the mechanical connector 102, such that signal integrity within the conductor portion 202 may be maintained. By being electrically isolated, it will be appreciated that the conductor portion 202 can be at least partially isolated from the effects of radio frequency noise.

Turning again to FIG. 3, as illustrated in this example, the first seal 214 can extend circumferentially around the conductor portion 202 and circumferentially within the grounded portion 204. As such, the first seal 214 can be substantially continuously in contact with and sealed with the conductor portion 202 and the inner radial surface 208 of the grounded portion 204. Accordingly, the first seal 214 can be substantially devoid of gaps, spaces, openings, etc., through which the unwanted materials could pass through.

The first seal 214 can extend between a first seal end 300 and a second seal end 302. In this example, the first seal end 300 can be substantially flush with the first end 106 of the mechanical connector 102. The first seal 214 can have a length (e.g., defined between the first seal end 300 and the second seal end 302) that can be less than a total length of the mechanical connector 102. The first seal 214 and the second seal 215 can define a first sealed chamber 304 that can be defined between the first seal 214 and the second seal 215 (see FIG. 2) at opposing axial ends, and between the conductor portion 202 and the grounded portion 204 at inner and outer radial sides, respectively.

In this example, the third seal 218 can extend circumferentially around the grounded portion 204 and circumferentially within the opening 200 of the mechanical connector 102. As such, the third seal 218 can be substantially continuously in contact with and sealed with the outer radial surface 216 of the grounded portion 204 and the inner wall 217 of the mechanical connector 102. Accordingly, the third seal 218 can be substantially devoid of gaps, spaces, openings, etc., through which the unwanted materials could pass through.

The third seal 218 can extend between a first seal end 310 and a second seal end 312. In this example, the first seal end 310 can be substantially flush with the first end 106 of the mechanical connector 102 and/or with the first seal end 300 of the first seal 214. The third seal 218 can have a length (e.g., defined between the first seal end 310 and the second seal end 312) that can be less than a total length of the mechanical connector 102. In a possible example, a length of the third seal 218 can be substantially similar to a length of the first seal 214. The third seal 218 and the fourth seal 220 can define a second sealed chamber 314 that can be defined between the third seal 218 and the fourth seal 220 at opposing axial ends, and between the grounded portion 204 and the inner wall 217 of the mechanical connector 102 at inner and outer radial sides, respectively.

Figure 4:
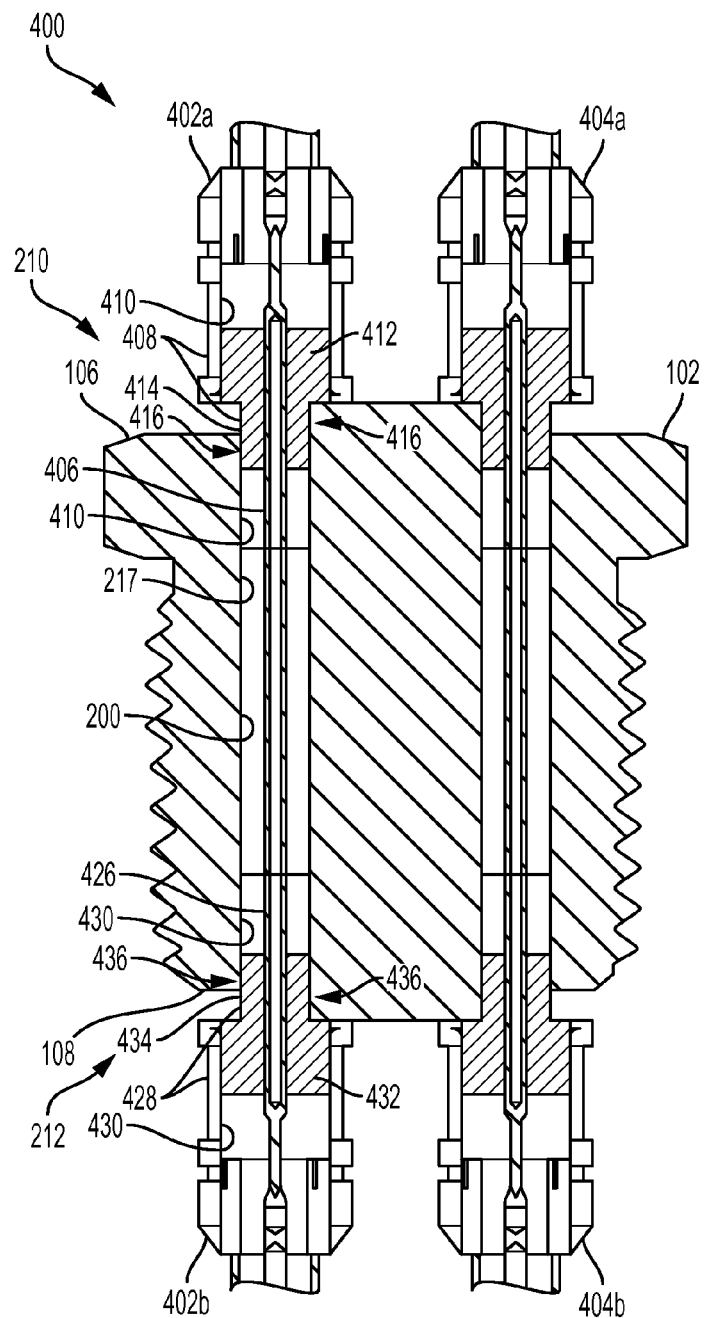
FIG. 4 is a sectional illustration of a second example electrical feed through assembly.

Turning to FIG. 4, a second example electrical feed through assembly 400 is illustrated. It is to be appreciated that the second electrical feed through assembly 400 that is illustrated in FIG. 4 is merely exemplary, and is not intended to illustrate all portions, parts, structures, components, etc. of the second electrical feed through assembly 400. Indeed, in some examples, the second electrical feed through assembly 400 may include other portions, parts, structures, components that are not illustrated herein. In other examples, portions of the second electrical feed through assembly 400 may not be included in operation. Likewise, the size, dimensions, etc. of the second electrical feed through assembly 400 that are illustrated in FIG. 4 are not intended to be limiting.

In this example, the second electrical feed through assembly 400 can include one or more structures of the electrical feed through assembly 100 illustrated and described with respect to FIGS. 1 to 3. For example, the second electrical feed through assembly 400 can include the mechanical connector 102 extending between the first end 106 and the second end 108. The mechanical connector 102 can define one or more openings 200 through the mechanical connector 102 between the first end 106 and the second end 108.

The second electrical feed through assembly 400 can include one or more electrical connectors. In the illustrated example, the second electrical feed through assembly 400 can include a first electrical connector 402a, a second electrical connector 402b, a third electrical connector 404a, and a fourth electrical connector 404b. The second electrical feed through assembly 400 is not limited to the illustrated number of electrical connectors, and in other examples, could include a total of eight electrical connectors, with two electrical connectors associated with each opening defined within the mechanical connector 102.

Focusing upon the first electrical connector 402a, the first electrical connector 402a can extend at least partially through the opening 200 in the mechanical connector 102. In this example, the first electrical connector 402a can extend through the opening 200 at the first end 106 of the mechanical connector 102. As such, the first electrical connector 402a can be attached to the first end 106 of the mechanical connector 102. The first electrical connector 402a can include a conductor portion 406. The conductor portion 406 can extend into the opening 200 through the first end 106 of the mechanical connector 102. The conductor portion 406 can be substantially similar to the conductor portion 202, and may include an electrically conductive material. As such, the conductor portion 406 can be capable of electrically transmitting signals, current, etc. The conductor portion 406 can include, for example, metal materials, or the like.

The first electrical connector 402a can include a grounded portion 408 within which the conductor portion 406 can be received. In this example, the grounded portion 408 can extend at least partially through the opening 200 at the first end 106 of the mechanical connector 102. The grounded portion 408 can have a non-constant cross-sectional size, and in this example, can have a plurality of different cross-sectional sizes between opposing ends of the first electrical connector 402a. The grounded portion 408 may be substantially similar to the grounded portion 204 illustrated in FIGS. 1 to 3, with the grounded portion 408 including an electrically conductive material such that the grounded portion 408 can act as an electrical shield or an electrical ground. The grounded portion 408 can include, for example, metal materials, or the like.

The grounded portion 408 may be substantially hollow so as to define the channel 206 extending through the center of the grounded portion 408. In an example, the grounded portion 408 can receive the conductor portion 406 such that the grounded portion 408 and the conductor portion 406 can extend substantially coaxially with respect to each other. In a possible example, the conductor portion 406, the grounded portion 408, and the opening 200 in the mechanical connector 102 can extend substantially coaxially with respect to each other.

The grounded portion 408 can include an inner radial surface 410 that defines an interior of the grounded portion 408. In an example, the inner radial surface 410 of the grounded portion 408 can be sealed with the conductor portion 406. In the illustrated example, the inner radial surface 410 of the grounded portion 408 can be sealed with the conductor portion 406 at the first location 210, which can be adjacent the first end 106 of the mechanical connector 102.

In the illustrated example, a first seal 412 between the inner radial surface 410 of the grounded portion 408 and the conductor portion 406 can be formed at the first location 210. In this example, the first seal 412 can include a hermetic seal, such as a glass to metal seal. The first seal 412, which may include the hermetic seal, between the inner radial surface 410 of the grounded portion 408 and the conductor portion 406 can limit the ingress/egress of unwanted materials into and/or out of the opening 200. For example, the first seal 412 can limit unwanted materials such as moisture, liquids, particulates, gases, vapors, etc. from passing between the grounded portion 408 and the conductor portion 406. As such, these unwanted materials may be substantially limited from passing through the mechanical connector 102 (e.g., between the first end 106 and the second end 108) between the grounded portion 408 and the conductor portion 406.

The grounded portion 408 can include an outer radial surface 414 that defines an exterior of the grounded portion 408. In an example, the outer radial surface 414 of the grounded portion 408 can be attached to the inner wall 217 of the mechanical connector 102 in proximity to the first location 210, which can be adjacent the first end 106 of the mechanical connector 102. In this example, the grounded portion 408 can be at least partially inserted into the opening 200, such as with a pressure fit or the like.

The attachment between the outer radial surface 414 of the grounded portion 408 and the inner wall 217 of the mechanical connector 102 can include a seal. In the illustrated example, a third seal 416 between the outer radial surface 414 of the grounded portion 408 and the inner wall 217 of the mechanical connector 102 can be formed adjacent the first location 210. The third seal 416 can include, for example, a hermetic seal, such as a glass to metal seal. In some examples, the third seal 416 can include brazing, welding, or other similar methods of attaching the outer radial surface 414 of the grounded portion 408 to the inner wall 217 of the mechanical connector 102. The third seal 416, which may include the hermetic seal, can limit the ingress/egress of unwanted materials into and/or out of the opening 200. As such, these unwanted materials may be substantially limited from passing through the mechanical connector 102 (e.g., between the first end 106 and the second end 108) between the grounded portion 408 and the mechanical connector 102.

Focusing now upon the second electrical connector 402b, the second electrical connector 402b can extend at least partially through the opening 200 in the mechanical connector 102. In this example, the second electrical connector 402b can extend through the opening 200 at the second end 108 of the mechanical connector 102. As such, the second electrical connector 402b can be attached to the second end 108 of the mechanical connector 102. The second electrical connector 402b can include a second conductor portion 426. The second conductor portion 426 can extend into the opening 200 through the second end 108 of the mechanical connector 102.

The second conductor portion 426 can be substantially similar to the conductor portion 202, and the conductor portion 426, and may include an electrically conductive material. As such, the second conductor portion 426 can be capable of electrically transmitting signals, current, etc. The second conductor portion 426 can include, for example, metal materials, or the like. The second conductor portion 426 can be electrically connected to the conductor portion 406, such as towards a center of the opening 200 at a location within the mechanical connector 102. As such, electrical signals, current, etc. can be transmitted between the conductor portion 406 and the second conductor portion 426.

The second electrical connector 402b can include a second grounded portion 428 within which the second conductor portion 426 can be received. In this example, the second grounded portion 428 can extend at least partially through the opening 200 at the second end 108 of the mechanical connector 102. The second grounded portion 428 may be substantially similar to the grounded portion 204 illustrated in FIGS. 1 to 3 and the grounded portion 408, with the second grounded portion 428 including an electrically conductive material such that the second grounded portion 428 can act as an electrical shield or an electrical ground. The second grounded portion 428 can include, for example, metal materials, or the like.

The second grounded portion 428 may be substantially hollow so as to define the channel 206 extending through the center of the second grounded portion 428. In an example, the second grounded portion 428 can receive the second conductor portion 426 such that the second grounded portion 428 and the second conductor portion 426 can extend substantially coaxially with respect to each other. In a possible example, the second conductor portion 426, the second grounded portion 428, and the opening 200 in the mechanical connector 102 can extend substantially coaxially with respect to each other.

The second grounded portion 428 can include an inner radial surface 430 that may define an interior of the second grounded portion 428. In an example, the inner radial surface 430 of the second grounded portion 428 can be sealed with the second conductor portion 426. In the illustrated example, the inner radial surface 430 of the second grounded portion 428 can be sealed with the second conductor portion 426 at the second location 212, which may be adjacent the second end 108 of the mechanical connector 102.

In the illustrated example, a second seal 432 between the inner radial surface 430 of the second grounded portion 428 and the second conductor portion 426 can be formed at the second location 212. In this example, the second seal 432 can include a hermetic seal, such as a glass to metal seal. The second seal 432, which may include the hermetic seal, between the inner radial surface 430 of the second grounded portion 428 and the second conductor portion 426 can limit the ingress/egress of unwanted materials into and/or out of the opening 200. For example, the second seal 432 can limit unwanted materials such as moisture, liquids, particulates, gases, vapors, etc. from passing between the second grounded portion 428 and the second conductor portion 426. As such, these unwanted materials may be substantially limited from passing through the mechanical connector 102

(e.g., between the first end 106 and the second end 108) between the second grounded portion 428 and the second conductor portion 426.

The second grounded portion 428 may include an outer radial surface 434 that defines an exterior of the second grounded portion 428. In an example, the outer radial surface 434 of the second grounded portion 428 can be attached to the inner wall 217 of the mechanical connector 102 in proximity to the second location 212, which can be adjacent the second end 108 of the mechanical connector 102. In this example, the second grounded portion 428 can be at least partially inserted into the opening 200, such as with a pressure fit or the like.

The attachment between the outer radial surface 434 of the second grounded portion 428 and the inner wall 217 of the mechanical connector 102 can include a seal. In the illustrated example, a fourth seal 436 between the outer radial surface 434 of the second grounded portion 428 and the inner wall 217 of the mechanical connector 102 can be formed adjacent the second location 212. The fourth seal 436 can include, for example, a hermetic seal, such as a glass to metal seal. In some examples, the fourth seal 436 can include brazing, welding, or other similar methods of attaching the outer radial surface 434 of the second grounded portion 428 to the inner wall 217 of the mechanical connector 102. The fourth seal 436, which may include the hermetic seal, can limit the ingress/egress of unwanted materials into and/or out of the opening 200. As such, these unwanted materials may be substantially limited from passing through the mechanical connector 102 (e.g., between the first end 106 and the second end 108) between the second grounded portion 428 and the mechanical connector 102.

In this example, in proximity to the first location 210, the grounded portion 408 can be attached to and/or sealed with the inner wall 217 of the mechanical connector 102 at an outer radial side and with the conductor portion 406 at an inner radial side. At the second location 212, the second grounded portion 428 can be attached to and/or may be sealed with the inner wall 217 of the mechanical connector 102 at the outer radial side and with the second conductor portion 426 at the inner radial side. As such, the first seal 402 and the second seal 432 can function to seal the grounded portion 408 to the conductor portion 406 and the second grounded portion 428 to the second conductor portion 426 at both the first end 106 and the second end 108 of the mechanical connector 102.

The third seal 416 and the fourth seal 436 can function to seal the grounded portion 408 to the inner wall 217 of the mechanical connector 102 and the second grounded portion 428 to the inner wall 217 at both the first end 106 and the second end 108 of the mechanical connector 102. As such, the unwanted materials may be substantially limited from passing through the mechanical connector 102 due to the presence of the seals.

With respect to the electrical feed through assembly 100 and/or the second electrical feed through assembly 400, the seals (e.g., the first seals 214, 412, the second seals 215, 432, the third seals 218, 416, and/or the fourth seals 220, 436) may be resistant to a leakage pressure such that unwanted materials (e.g., liquids, gases, etc.) are substantially limited from passing through the mechanical connector 102 of the electrical feed through assembly 100, 400. In a possible example, the seals (e.g., the first seals 214, 412, the second seals 215, 432, the third seals 218, 416, and/or the fourth seals 220, 436) may be resistant to a leakage pressure of up to about 7 megapascal (MPa) (e.g., up to about 1015 pounds per square inch). In another example, the seals may be resistant to a leakage pressure of up to about 10 MPA (e.g., up to about 1450 pounds per square inch). In yet another example, the seals may be resistant to a leakage pressure of up to about 10.35 MPA (e.g., up to about 1500 pounds per square inch). As a result, the seals, damage to the electrical conductors and/or signal degradation may be reduced.

The seals can (e.g., the first seals 214, 412, the second seals 215, 432, the third seals 218, 416, and/or the fourth seals 220, 436) be implemented using a glass to metal sealing technique. For example, the seals (e.g., the first seals 214, 412, the second seals 215, 432, the third seals 218, 416, and/or the fourth seals 220, 436) can be sealed with respect to the metal conductors (e.g., the mechanical connector 102, the conductor portion 202, and the grounded portion 204). In some possible examples, the seals can bond with the metal conductors and the thermal expansion of the seals (e.g., glass material) and the metal conductors can be relatively closely matched such that the seal can remain as the assembly cools.

In addition to limiting the ingress/egress of unwanted materials, the seals can function to electrically isolate one or more components. For example, the first seal 412 can function to electrically isolate the conductor portion 406 from the grounded portion 408. Similarly, the second seal 432 can function to electrically isolate the second conductor portion 426 from the second grounded portion 428. The third seal 416 can function to electrically isolate the grounded portion 408 from the mechanical connector 102. The fourth seal 436 can function to electrically isolate the second grounded portion 428 from the mechanical connector 102. As such, electrical current flow between the conductor portion 406 or the second conductor portion 426 and the mechanical connector 102 may be substantially limited and/or reduced, or even possibly eliminated. Accordingly, the seals can function to electrically isolate the conductor portion 406 and the second conductor portion 426, such that signal integrity within the conductor portion 406 and the second conductor portion 426 may be maintained.

By electrically isolating the conductor portions 406, 426 from the grounded portions and/or the mechanical connector, it will be appreciated that the conductor portions can be at least partially isolated from the effects of radio frequency noise. That is, the effects of radio frequency noise on the conductor portions 406, 426 can be reduced due to the construction of the electrical feed through assembly 100, 400.

The disclosed subject matter has been described with reference to the example embodiments described above. Modifications and alterations will occur to others upon a reading and understanding of this specification. Example embodiments incorporating one or more aspects of the disclosure are intended to include all such modifications and alterations insofar as they come within the scope of the appended claims.

What is claimed is:

1. An electrical feed through assembly comprising:
a mechanical connector including a first end and a second end, the mechanical connector defining at least one opening through the mechanical connector between the first end and the second end;
a first electrical connector configured to be attached to the first end of the mechanical connector, the first electrical connector including:
a conductor portion configured to extend through the at least one opening in the mechanical connector; and
a hollow grounded portion defining a channel within which the conductor portion is received and spaced radially inward away from the grounded portion, an inner radial surface of the grounded portion configured to be sealed with the conductor portion, an outer radial surface of the grounded portion configured to be attached to the mechanical connector, and the grounded portion extending continuously through the at least one opening between the first end and the second end.

2. The electrical feed through assembly of claim 1, wherein the attachment between the outer radial surface of the grounded portion and the mechanical connector includes a seal.

3. The electrical feed through assembly of claim 2, wherein the seal between the outer radial surface of the grounded portion and the mechanical connector includes a hermetic seal.

4. The electrical feed through assembly of claim 1, wherein a hermetic seal is provided to seal between the inner radial surface of the grounded portion and the conductor portion.

5. The electrical feed through assembly of claim 1, wherein a second electrical connector is configured to be attached to the second end of the mechanical connector.

6. The electrical feed through assembly of claim 5, wherein the second electrical connector includes:
a second conductor portion that is configured to extend through the at least one opening in the mechanical connector; and
a second grounded portion within which the second conductor portion is received, an inner radial surface of the second grounded portion configured to be sealed with the second conductor portion, an outer radial surface of the second grounded portion configured to be attached to the mechanical connector.

7. The electrical feed through assembly of claim 6, wherein the attachment between the outer radial surface of the second grounded portion and the mechanical connector includes a seal.

8. The electrical feed through assembly of claim 7, wherein the seal between the outer radial surface of the second grounded portion and the mechanical connector includes a hermetic seal.

9. The electrical feed through assembly of claim 6, wherein the conductor portion of the first electrical connector and the second conductor portion of the second electrical connector are electrically connected.

10. The electrical feed through assembly of claim 1, wherein the conductor portion extends substantially continuously through the opening in the mechanical connector between the first end and the second end.

11. The electrical feed through assembly of claim 10, wherein the grounded portion extends substantially continuously through the opening in the mechanical connector between the first end and the second end.

12. The electrical feed through assembly of claim 11, wherein a first location of the grounded portion at the outer radial surface is configured to be attached to the mechanical connector adjacent the first end of the mechanical connector.

13. The electrical feed through assembly of claim 1, wherein a hermetic seal between the outer radial surface of the grounded portion and the mechanical connector is resistant to a leakage pressure of up to about 7 megapascal (MPa).

14. An electrical feed through assembly comprising:
a mechanical connector extending between a first end and a second end, the mechanical connector defining at least one opening through the mechanical connector between the first end and the second end;
a first electrical connector configured to be attached to the first end of the mechanical connector, the first electrical connector including:
a conductor portion that is configured to extend through the at least one opening in the mechanical connector; and
a hollow grounded portion defining a channel within which the conductor portion is received and spaced radially inward away from the grounded portion, an outer radial surface of the grounded portion configured to be hermetically sealed to the mechanical connector, and the grounded portion extending continuously through the at least one opening between the first end and the second end.

15. The electrical feed through assembly of claim 14, wherein the hermetic seal between the outer radial surface of the grounded portion and the mechanical connector includes a glass to metal seal.

16. The electrical feed through assembly of claim 14, wherein the hermetic seal between the outer radial surface of the grounded portion and the mechanical connector is resistant to a leakage pressure of up to about 7 megapascal (MPa).

17. The electrical feed through assembly of claim 16, wherein the hermetic seal between the outer radial surface of the grounded portion and the mechanical connector is resistant to a leakage pressure of up to about 10 megapascals (MPa).

18. The electrical feed through assembly of claim 14, wherein the grounded portion is configured to be sealed with the conductor portion.

19. The electrical feed through assembly of claim 18, wherein the seal between the grounded portion and the conductor portion is resistant to a leakage pressure of up to about 10 megapascal (MPa).

20. An electrical feed through assembly comprising:
a mechanical connector extending between a first end and a second end, the mechanical connector defining at least one opening through the mechanical connector between the first end and the second end;
a first electrical connector configured to be attached to the first end of the mechanical connector, the first electrical connector including:
a conductor portion that is configured to extend through the at least one opening in the mechanical connector; and
a hollow grounded portion defining a channel within which the conductor portion is received and spaced radially inward away from the grounded portion, an inner radial surface of the grounded portion configured to be sealed with the conductor portion, an outer radial surface of the grounded portion configured to be attached to the mechanical connector, and the grounded portion extending continuously through the at least one opening between the first end and the second end;
a second electrical connector configured to be attached to the second end of the mechanical connector, the second electrical connector including:
a second conductor portion that is configured to extend through the at least one opening in the mechanical connector, the second conductor portion electrically connected to the conductor portion of the first electrical connector; and
a second hollow grounded portion defining a second channel within which the second conductor portion is received and spaced radially inward away from the second grounded portion, an inner radial surface of the second grounded portion configured to be sealed with the second conductor portion, an outer radial surface of the second grounded portion configured to be attached to the mechanical connector, and the second grounded portion extending continuously through the at least one opening between the first end and the second end.

\* \* \* \* \*

UNITED STATES PATENT AND TRADEMARK OFFICE
CERTIFICATE OF CORRECTION

PATENT NO. : 9,553,398 B2  
APPLICATION NO. : 14/731477  
DATED : January 24, 2017  
INVENTOR(S) : John Austin True et al.

Page 1 of 1

It is certified that error appears in the above-identified patent and that said Letters Patent is hereby corrected as shown below:

On the Title Page

In item (71) please insert city and state of Applicant to read: --Schenectady, NY--

Signed and Sealed this  
Second Day of May, 2017

Michelle K. Lee  
*Director of the United States Patent and Trademark Office*